Sept. 22, 1931.   H. R. POLLOCK   1,823,985
DIRECTION AND MOVEMENT INDICATOR FOR VEHICLES
Filed Jan. 6, 1931   2 Sheets-Sheet 1

Sept. 22, 1931.  H. R. POLLOCK  1,823,985

DIRECTION AND MOVEMENT INDICATOR FOR VEHICLES

Filed Jan. 6, 1931  2 Sheets-Sheet 2

Inventor:
H. R. Pollock,
By Byrnes, Stebbins, Parmelee & Blenko,
Attys.

Patented Sept. 22, 1931

1,823,985

UNITED STATES PATENT OFFICE

HUMPHREY RIVERS POLLOCK, OF LONDON, ENGLAND, ASSIGNOR TO ROBERT JAMES PATON, OF LONDON, ENGLAND

DIRECTION AND MOVEMENT INDICATOR FOR VEHICLES

Application filed January 6, 1931, Serial No. 507,016, and in Great Britain January 11, 1930.

This invention relates to indicators for signalling the intention of the driver of a vehicle to other persons and is concerned with that class of indicator in which an indicating arm mounted in a base part can turn about two axes inclined (preferably at right angles) to one another to give different characteristic signals under the control of a single control member.

In indicators of this class the arm has generally been moved about one axis by moving an operating shaft connected to the single control member endwise and about the other axis inclined to the former by turning the shaft. The characteristic signals which an indicator of the class above referred to can make are:

(a) "I am going to stop or slow down". This signal consists in oscillating the indicating arm in a vertical plane;

(b) "I am going to turn left"—or "right". This signal consists in holding the arm stationary, out from the vehicle, in a horizontal plane on the left or right-hand side of the vehicle, according to the "rule of the road" recognized where the indicator is used;

(c) "Overtake me". This signal consists in oscillating the indicator arm in a horizontal plane.

An object of the present invention is to enable all, or any one of the above signals to be given by an indicator of the class described by the same generic movement (preferably endwise) of an operating shaft or of operating means.

According to the present invention a direction and movement indicator of the kind described above comprises a driving element mounted to reciprocate on the base part and operatively connected to the arm and to the control member and a device (for example a cam and follower) arranged to constrain the arm to turn (a) about its horizontal pivotal axis from a substantially vertical position to an inclined or substantially horizontal position, and (b) about its vertical axis if the driving element is moved continuously sufficiently far in one direction.

Preferably the driving element is connected to the arm by a connection which yields or becomes ineffective on the completion of the turning movement of the arm about its horizontal axis. Thus the driving element may be connected to the arm by a spring and an abutment may be provided to limit the turning movement of the arm from its substantially vertical position.

Conveniently an auxiliary operating member is rotatably mounted on the base part, is engaged with the arm to transmit turning movement thereto about a vertical axis (for example the auxiliary operating member may constitute a support on which the arm is mounted to turn about its horizontal axis) and is operatively connected to the driving element to be turned thereby about a vertical axis under the control of the controlling device (for example it is connected to the driving element by a cam and follower device).

According to a further feature of the invention, there is combined with a direction and movement indicator as above described a linkage system arranged between the single control member and the driving element so that the control member can be fulcrumed at a distance from its operating end and at the same time ensure for the driving element adequate movement for the completion of all stages of movement of the indicator arm.

According to still another feature of the invention the single control member and the combination set out in the preceding paragraph, may be fulcrumed at one side of a casing and may be coupled between its ends to the linkage system which is accommodated in the casing.

Referring to the accompanying drawings which illustrate an embodiment of the invention, and wherein—

Figure 1:
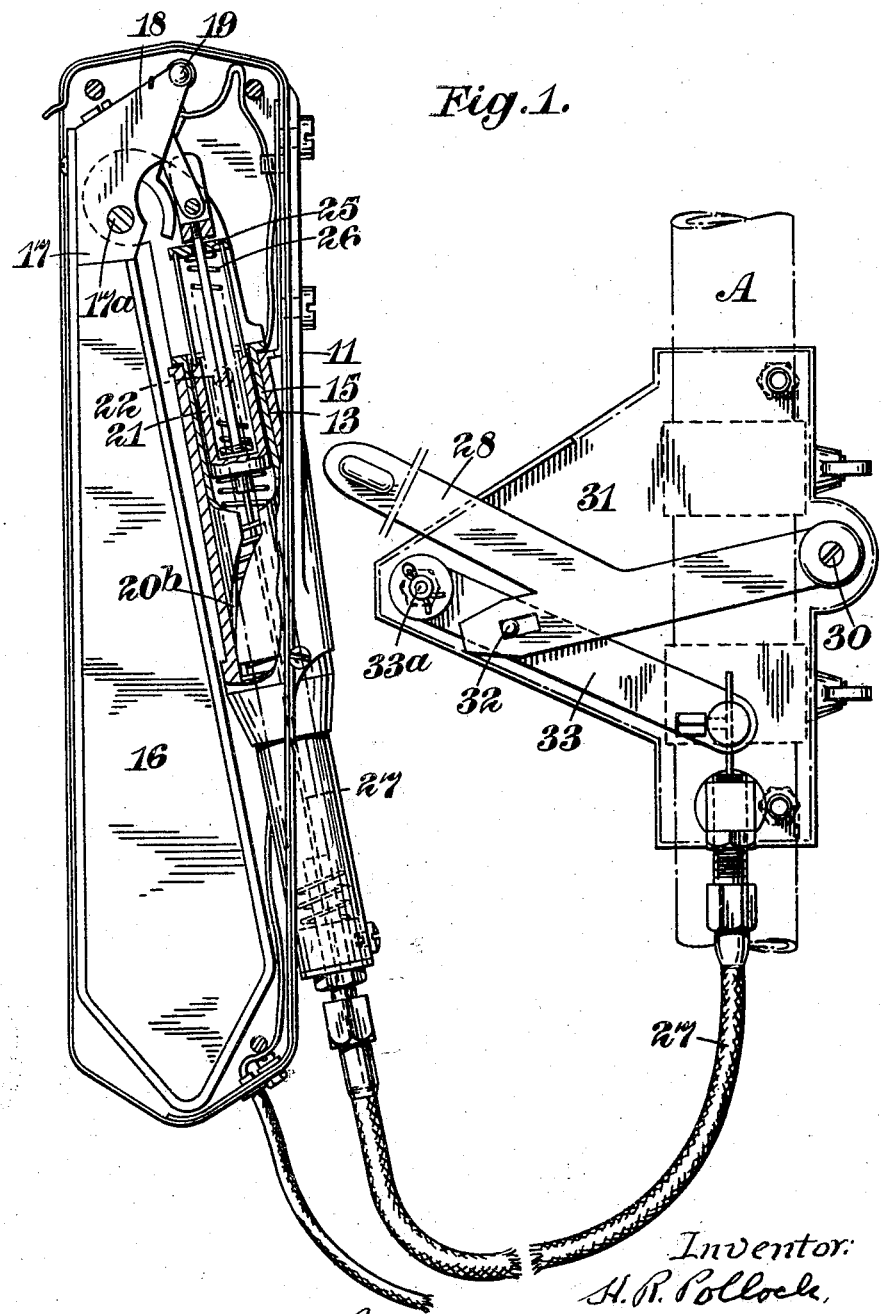
Figure 1 is a part sectional elevation of the indicator showing the operating parts for producing the vertical movement of the indicator arm and also showing in a developed form the linkage which is arranged between the single control member and the driving element of the device.
Figure 2:
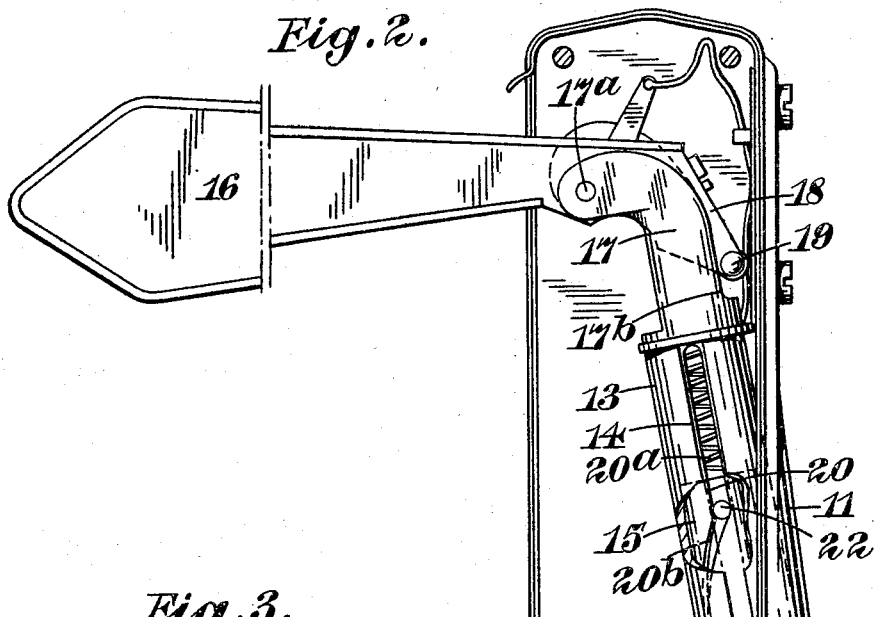
Figure 2 is an elevation with one side of the casing for the indicator arm removed, part of the interior being cut away, showing the manner in which horizontal movement of the indicator arm is produced.
Figure 3:
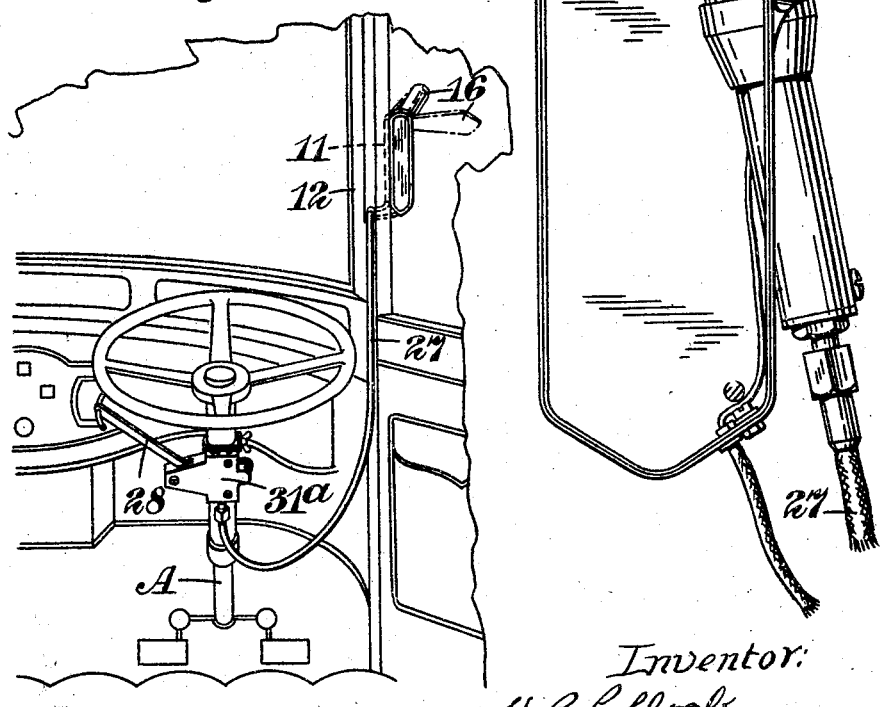
Figure 3 is a perspective view showing the device mounted in a motor vehicle and showing the location of the single control member in proximity to the steering wheel of the vehicle, whereby the driver can operate the indicator with one hand on the wheel.

The indicator comprises a base part 11 arranged so that it can be secured at a convenient point outside the vehicle 12, indicated in Figure 3. A fixed tube 13 is mounted on the base part to extend upwards with its axis substantially vertical and is formed with two diametrically opposed vertical slots 14, parallel to this axis. A second tube 15 is mounted to rotate on the fixed tube and constitutes a rotatable support for an indicating arm 16. The indicating arm is hollow to receive an illuminating lamp and is mounted at one end on a bracket 17 on the top of the supporting tube 15 so as to turn about a horizontal axis 17a. Normally the indicating arm 16 extends downwardly from the bracket, as shown in Figure 1. but it can be raised until an abutment 19 on a rearward extension 18 of the arm engages a stop 17b on the bracket 17, the arm will then extend in a horizontal direction. The supporting tube 15 is formed with two cam slots 20 which are arranged diametrically opposite one another and each of which has its upper half 20a extending in the direction of the axis of the supporting tube 15 and its lower half 20b extending helically around the tube. Mounted within the fixed tube 13 is a cylindrical driving element 21 having two projecting pins 22 engaged with the guiding slots 14 in the fixed tube 13 and with the cam slots 20 in the moving tube 15. The upper end 25 of the driving element is connected to the rearward extension 18 of the indicating arm by a helical spring 26. The lower end of the driving element is connected to one end of a flexible cable 27, the other end of which is connected through a linkage to a controlling lever or knob 28 adapted to be mounted within the vehicle at some position convenient to the driver, such as on the steering column A (see Figure 3).

The linkage system is arranged so that the lever 28 fulcrumed at 30 on a back-plate 31 of a casing 31a, secured for example on the steering column A, has a pin and slot connection 32 with a lever 33 fulcrumed at 33a on the back-plate 31. The other end of the lever 33 is coupled to the flexible cable 27. The pin and slot connection 32, which is proportioned to allow sufficient play for the relative longitudinal movements of the levers 28 and 33 moving angularly, is so located on the lever 33 that the velocity ratio between the operator's end of lever 28 and the cable end of lever 33 is substantially one with the result that a comparatively big longitudinal movement can be imparted to the driving element 21 to effect rotational movements of the indicating arm 16 about both a horizontal and a vertical axis in a continuous movement. At the same time arranging the linkage as described enables a compact casing (e. g. of dimensions corresponding to the back plate 31) to be mounted on the steering column.

The indicator is operated by pulling on the control lever or knob 28 and so moving the flexible shaft 27 endwise. This causes the driving element 21 to reciprocate within the fixed tube 13. During the first half of the driving element's reciprocating movement in one direction, it causes the indicating arm 16 to rise from its downwardly extending position to its horizontal position. Further turning movement of the arm about its horizontal pivot on the supporting tube 13 is then prevented by the engagement of the abutment 19 with the arm-bracket 18 and as the driving element moves downwards the spring 26 tends to be compressed. At this point the pins 22 on the driving element 21 leave the vertical axial portion 20a of the cam slots 20 in the supporting tube and enter into the helical portions 20b. Further downwards movement of the driving element will cause the supporting tube 15 to rotate since the driving element is prevented from rotating itself by the guiding slots 14 in the fixed tube 13. Thus as the control lever or knob is pulled outwardly the arm is raised to a horizontal position and will turn about a vertical axis.

When it is desired to give a "slow-down" or "stop" signal the control lever or knob is pulled half-way out and returned several times in succession so as to cause the arm to turn about its horizontal axis several times. To give the "turn right" signal the control lever is pulled half-way out and held there, the arm being thus moved to its horizontal position. To give the "overtake" or "turning left" signal the control lever is pulled full out and is then reciprocated between its half-way position and its full out position. This will raise the arm to its horizontal position and then cause it to turn about its vertical axis several times.

Instead of providing a spring connection between the indicating arm and the driving element, the rearward extension 18 of the arm 16 may pass through a slot in the driving element 21.

In this case the slot in the driving element would be substantially of reversed L-shape and the pin would be suitably located on the rearward extension 18 of the arm so that the slotted driving element could move with respect to the indicating arm when the latter reaches its horizontal position. In other words the pin on the indicating arm would ride in the vertical slot to hold the arm in a horizontal position, and at the same time permit the driving element to initiate the turning movement of the arm about its other axis.

In a modified construction the cam slots are provided in a fixed tube and the driving element is provided with pins engaging these cam slots so that it is prevented from turning during the first part of its movement but constrained to turn during the second part of its movement. The driving element is further provided with extensions lying one to each side of the rearward extension of the indicating arm and the latter is universally mounted on the base part. The indicating arm is connected to the driving element by a spring and is prevented from moving beyond its horizontal position by an abutment as previously described. It will be seen that as the driving element is moved downwards it will move firstly without turning and will cause the arm to rise and then will move downwards and turn. The turning movement of the driving element is transmitted to the arm while the downwards movement is absorbed by the spring stretching.

Modifications may be made in the details of the indicator above described such as the using of mechanical equivalents and/or inversions of the various operating members but these modifications are all held to be within the scope of the present invention.

For example it will be obvious that if the position of the indicator arm is such that when not giving a signal it lies horizontal or substantially horizontal, then its first movement under the control of the driving element will be about a vertical axis the continued movement of the driving element producing rotation of the arm about a horizontal axis.

Moreover, the manner in which the driving element is driven is immaterial. Although it is preferred to use a control handle and Bowden mechanism, the movement of the driving element could be controlled by any suitable electrical fluid-operated or mechanical means.

I claim:—

1. In a direction and movement indicator having an indicating arm pivotally supported in a base-part and capable of turning about two axes inclined to one another and transverse to the length of the arm and a single control-member, for moving the indicating-arm, the combination of a driving element arranged to reciprocate on the base part, an operative connection between said driving element and the indicating arm, an operative connection between the said driving element and the single control member, and a device associated with the driving element and arranged to constrain the indicating arm to turn first about one axis and then about the other axis if the single control member is moved continuously in one direction.

2. In a direction and movement indicator having an indicating arm pivotally supported in a base-part and capable of turning about two axes inclined to one another and transverse to the length of the arm and a single control-member for moving the indicating-arm the combination of means associated with the arm for limiting the latter's movement about its first axis of rotation, a driving element arranged to reciprocate on the base-part, a yielding connection between said driving element and the indicating arm, which yields on completion of the said first axial rotation, an operative connection between the said driving element and the single control member, and a device associated with the driving element and arranged to constrain the indicating arm to turn first about one axis and then about the other axis if the single control member is moved continuously in one direction.

3. In a direction and movement indicator having an indicating arm pivotally supported in a base-part and capable of turning about two axes inclined to one another and transverse to the length of the arm and a single control-member for moving the indicating arm, the combination of a driving element arranged to reciprocate on the base-part, a spring-connection between said driving element and the indicating arm, an operative connection between the said driving element and the single control member, and a device associated with the driving element and arranged to constrain the indicating arm to turn first about one axis and then about the other axis if the single control member is moved continuously in one direction.

4. In a direction and movement indicator having an indicating arm pivotally supported in a base-part and capable of turning about two axes inclined to one another and transverse to the length of the arm and a single control-member for moving the indicating-arm, the combination of a driving element arranged to reciprocate on the base-part, an operative connection between the said driving element and the indicating arm, an operative connection between the said driving element and the single control member, an auxiliary member rotatably mounted in the base part, an operative connection between the said auxiliary member and the driving element and a device associated with the driving element and arranged to constrain the indicating arm to turn first about one axis and then about the other axis if the control member is moved continuously in one direction.

5. In a direction and movement indicator having an indicating arm pivotally supported in a base-part and capable of turning about two axes inclined to one another and transverse to the length of the arm and a single control-member for moving the indicating-arm, the combination of a driving element arranged to reciprocate on the base-part, an operative connection between the said driving element and the indicating arm, an operative connection between the said driving element and the single control member, an auxiliary member rotatably mounted in the base part, an operative connection between the said auxiliary member and the driving element and a lost-motion connection between the driving element and the indicating arm whereby the indicating arm is turned first about one axis and then about the other axis if the control member is moved continuously in one direction.

6. In a direction and movement indicator having an indicating arm pivotally supported in a base-part and capable of turning about two axes inclined to one another and transverse to the length of the arm and a single control-member for moving the indicating-arm, the combination of means associated with the arm for limiting the latter's movement about its first axis of rotation, a driving element arranged to reciprocate on the base-part, a yielding connection between the said driving element and the indicating arm, which yields on completion of the said first axial rotation, an operative connection between the said driving element and the single control member, an auxiliary member rotatably mounted in the base-part, an operative connection between the driving element and the said auxiliary member and a lost-motion connection between the driving element and the indicating arm, whereby the latter is turned first about one axis and then about the other axis if the control member is moved continuously in one direction.

7. In a direction and movement indicator having an indicating arm capable of turning about two axes inclined to one another and transverse to the length of the arm under the control of a single control member, the combination of a tubular-member supported in a base-part, a driving element arranged to reciprocate in the said tubular member, an operative connection between the said driving element and the indicating arm, an operative connection between the said driving element and the single control member, and a lost-motion connection between the driving element and the said tubular member, whereby the indicating arm is turned first about one axis and then about the other axis if the control member is moved continuously in one direction.

8. In a direction and movement indicator having an indicating arm capable of turning about two axes inclined to one another and transverse to the length of the arm under the control of a single control member, the combination of means associated with the arm for limiting the latter's movement about its first axis of rotation, a tubular member rotatably supported in a base-part, a driving element arranged to reciprocate in the said tubular member, a yielding connection between the said driving element and the indicating arm which yields on completion of the said first axial rotation, an operative connection between the said driving element and the single control member, and a lost motion connection between the driving element and the said tubular member, whereby the indicating arm is turned first about one axis and then about the other axis if the control member is moved continuously in one direction.

9. In a direction and movement indicator having an indicating arm capable of turning about two axes inclined to one another and transverse to the length of the arm under the control of a single control member, the combination of an indicating arm, a tubular member rotatably mounted in a base-part, means for pivotally supporting said arm in said tubular member, a driving element arranged to reciprocate in the tubular member, a yielding connection between the said driving element and the indicating arm, an operative connection between the said driving element and the single control member, and co-operating parts on the said driving element and the tubular member, whereby the indicating arm is turned first about one axis and then about the other axis if the control member is moved continuously in one direction.

10. In a direction and movement indicator having an indicating arm pivotally supported in a base-part and capable of turning about two axes inclined to one another and transverse to the length of the arm and a single control-member for moving the indicating-arm, the combination of a driving element arranged to reciprocate on the base-part, a yielding connection between the said driving element and the indicating arm, an operative connection between said driving element and the single control member and an abutment mounted on the base part in the neighbourhood of the indicating arm and co-operating therewith to limit the latter's movement about one axis and a pin-and-slot connection between the indicating arm and the driving element whereby the arm is turned first about one axis and then about the other axis if the control member is moved continuously in one direction.

11. In a direction and movement indicator having an indicating arm pivotally supported in a base-part and capable of turning about two axes inclined to one another and transverse to the length of the arm and a single control-lever for moving the indicating-arm the combination of a driving element arranged to reciprocate on the base-part, an operative connection between the said driving element and the indicating arm, an operating shaft, means connecting said shaft to the said driving element, a lever having a long and a short arm, means connecting the operating shaft to the long arm of the lever, a control lever having a long and a short arm, an operative connection between the short arm of the operating shaft lever and the short arm of the control lever, and a device associated with the driving element and arranged to constrain the indicating arm to turn first about one axis and then about the other axis if the single control lever is moved continuously in one direction.

12. In a direction and movement indicator having an indicating arm pivotally supported in a base part and capable of turning about two axes inclined to one another and transverse to the length of the arm and a single control-lever for moving the indicating-arm, the combination of means associated with the arm for limiting the latter's movement about its first axis of rotation, a driving element arranged to reciprocate on the base-part a yielding connection between the said driving element and the indicating arm which yields on the completion of the said first axial rotation, an operating shaft, means connecting said shaft to the said driving element, a lever having a long and a short arm, means connecting the operating shaft to the long arm of the said lever, a control lever having a long and a short arm, an operative connection between the short arms of the operating shaft lever and the control lever respectively, and a device associated with the driving element and arranged to constrain the connecting arm to turn first about one axis and then about the other axis if the single control lever is moved continuously in one direction.

13. In a direction and movement indicator having an indicating arm capable of turning about two axes inclined to one another and transverse to the length of the arm under the control of a single control lever, the combination of a tubular member rotatably supported in a base-part, a driving element arranged to reciprocate in the said tubular member, an operative connection between the said driving element and the indicating arm, an operating shaft, means connecting said shaft to the said driving element, a lever having a long and a short arm, means connecting the operating shaft to the long arm with the said lever, a control lever having a long and a short arm, an operative connection between the short arms of the operating shaft lever and the control lever respectively and a lost-motion connection between the driving element and the said tubular member whereby the indicating arm is turned first about one axis and then about the other axis if the control member is moved continuously in one direction.

14. In a direction and movement indicator having an indicating arm pivotally supported in a base-part and capable of turning about two axes inclined to one another and transverse to the length of the arm and a single control-lever for moving the indicating-arm the combination of a driving element arranged to reciprocate on the base-part, an operative connection between the said driving element of the indicating arm, an operating shaft, means connecting said shaft to the driving element, a lever having a long and short arm, a casing having a fulcrum for the said lever, means connecting the said operating shaft to the long arm of the said lever, a control lever having a long and a short arm, a fulcrum for the said control lever in the said casing, an operative connection between the short arms of the operating shaft lever and the control lever respectively, and a device associated with the driving element and arranged to constrain the connecting arm to turn first about one axis and then about the other axis if the single control lever is moved continuously in one direction.

In testimony whereof I have signed my name to this specification.

HUMPHREY RIVERS POLLOCK.